Oct. 6, 1942.　　　　H. ALLEN　　　　2,297,679
PRESSURE GAUGE
Filed June 7, 1938　　　　2 Sheets-Sheet 1

HERBERT ALLEN.
INVENTOR
BY Jesse R. Stone
Lester B. Clark
ATTORNEYS.

Oct. 6, 1942.　　　　　H. ALLEN　　　　　2,297,679
PRESSURE GAUGE
Filed June 7, 1938　　　　2 Sheets-Sheet 2
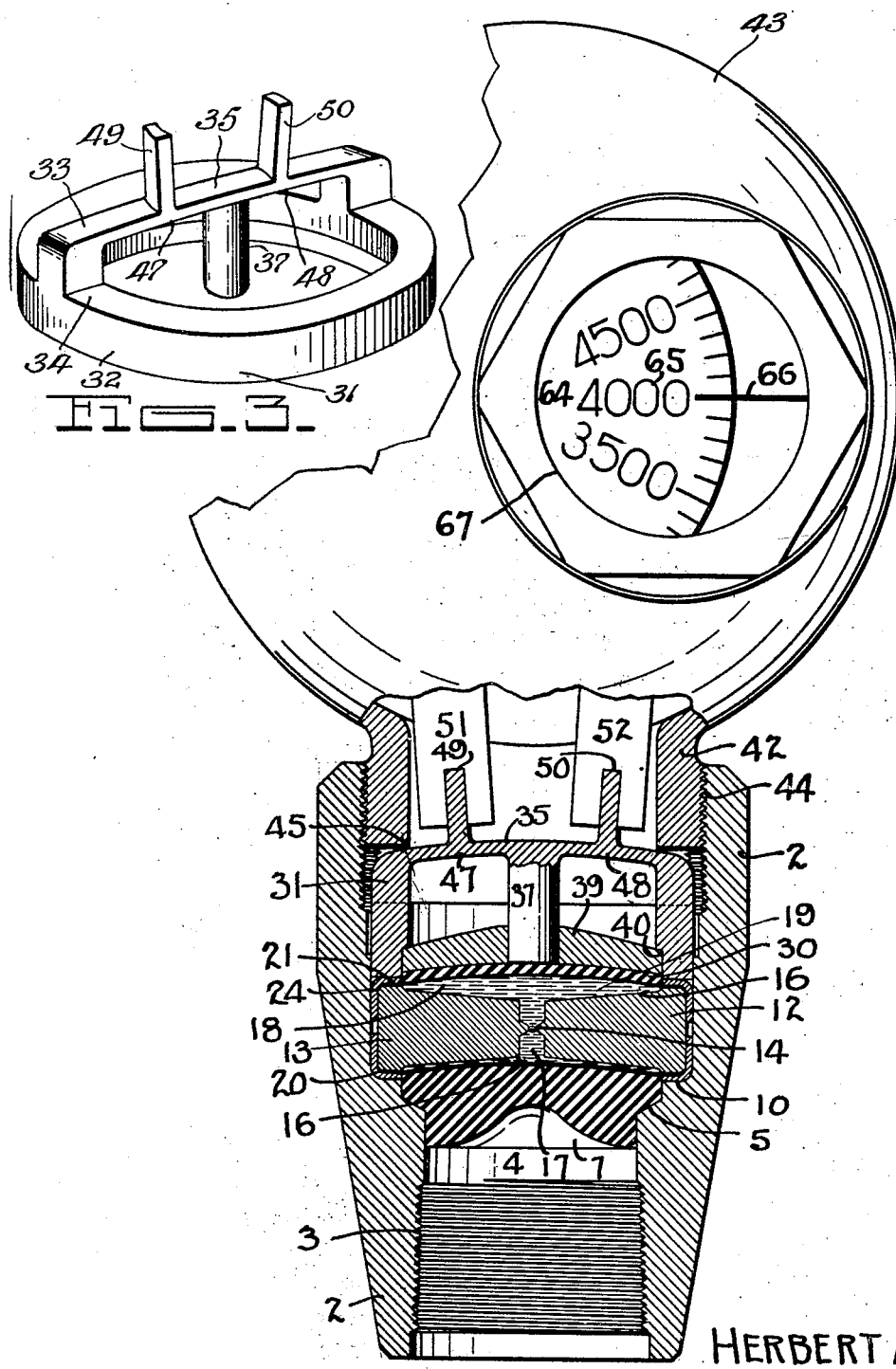
Herbert Allen
INVENTOR
BY Jesse R. Stone
Lester B Clark
ATTORNEYS.

Patented Oct. 6, 1942

2,297,679

UNITED STATES PATENT OFFICE 2,297,679

PRESSURE GAUGE

Herbert Allen, Houston, Tex., assignor to Abercrombie Pump Company, Houston, Tex., a corporation Application June 7, 1938, Serial No. 212,244

13 Claims. (Cl. 73—110)

The invention relates to a pressure gauge for indicating relatively high pressures in an accurate manner.

It is an object of the invention to provide a pressure gauge wherein the pressure is applied to a beam member to accomplish the flexing thereof in proportion to the applied pressure.

Another object of the invention is to provide a pressure gauge wherein an indicator is operated in proportion to the flexing of a beam member which is caused by the applied pressure.

Still another object of the invention is to mount a pressure gauge mechanism upon a flexible beam which is subjected to pressure in order to actuate the mechanism.

It is also an object of the invention to provide a flexible member to which actuating arms are connected so that as the member flexes the movement of the arms will be a function of the pressure applied in order that the movement of the arms may be utilized to indicate the amount of pressure.

It is another object of the invention to provide an indicator mechanism which is mounted on arms which are adapted to move apart in proportion to the pressure applied to the gauge so that the mechanism is actuated by the relative movement of the two arms.

Another object of the invention is to provide the combination of a pressure gauge diaphragm unit and flexure beam.

Still another object of the invention is to provide a cover plate and pressure member for pressure gauges so that the diaphragm or gauge will be constrained to apply movement to both the cover and the pressure member.

Still another object is to provide a pressure member and pressure diaphragm which will move together to prevent friction losses.

Other and further objects of the invention will be readily apparent when the following description is considered in connection with the accompanying drawings wherein:

Fig. 2 is a front elevation of the device showing the arrangement of the indicator disc.

Fig. 3 is a perspective view of the beam member which is utilized to indicate the pressure applied.

Figure 1:
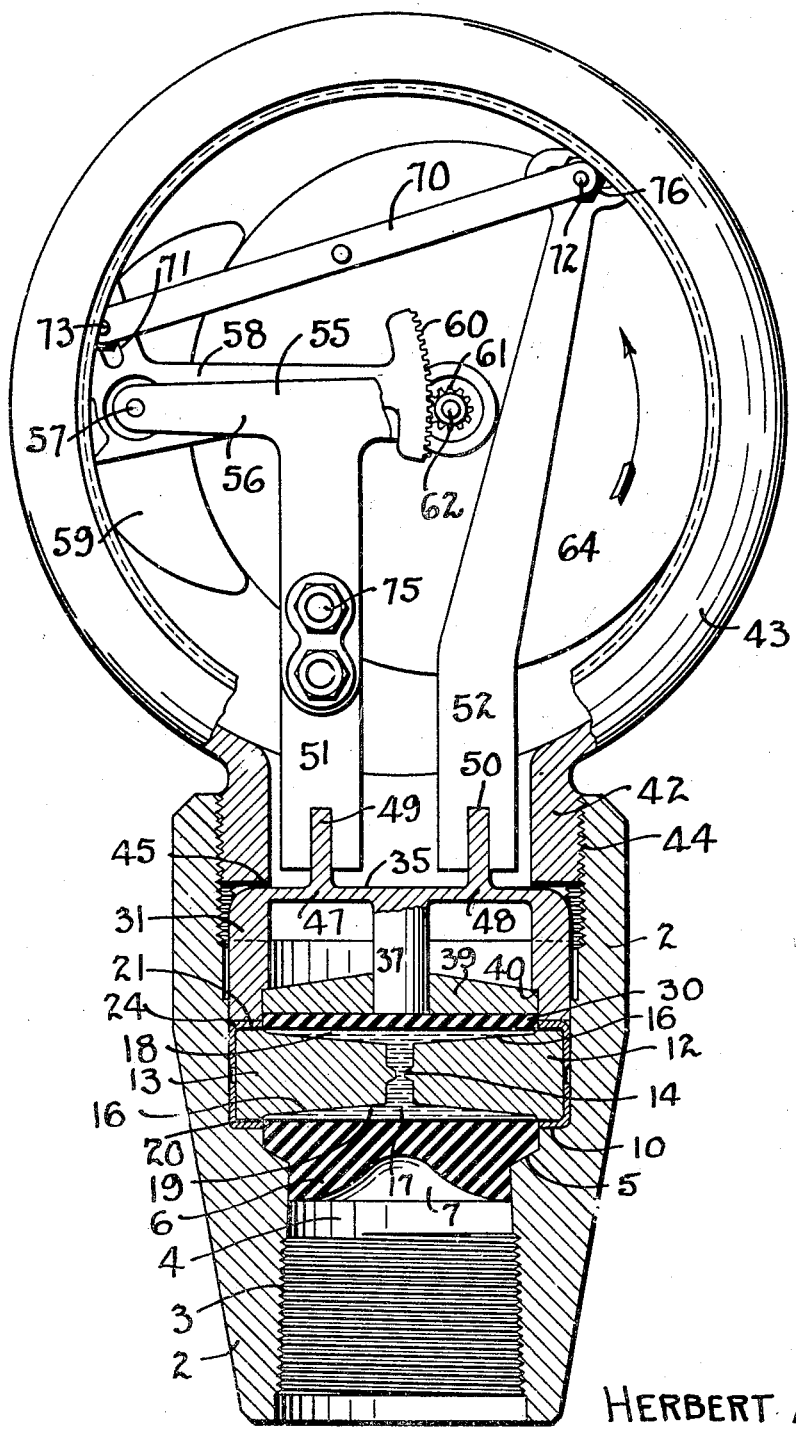
Fig. 1 is a back elevation of the pressure gauge with certain portions shown in section to illustrate the arrangement of the parts.

The present disclosure includes the frictionless washer and load transfer assembly disclosed and claimed in my prior copending application, Serial No. 151,658, filed July 2, 1937 for a Pressure gauge. The present application claims broadly the beam structure of my copending application Serial No. 367,160, filed November 26, 1940, for a Pressure gauge.

In Fig. 1 a coupling or nipple 2 is provided with threads 3 so that it may be connected to a suitable pipe or source of pressure which is to be gauged. This coupling has the passage 4 therein so that the pressure from the source may enter the nipple.

The nipple is internally enlarged to provide a shoulder 5 upon which the cushion plate 6 is positioned. This cushion may be made of any suitable resilient material and is enlarged to engage the shoulder 5 so that when it is inserted from the top it is accurately positioned. The lower face 7 of the plate may be indented so as to obtain the most satisfactory operation under pressure.

Above the shoulder 5 a second shoulder 10 is provided in the passage and this shoulder is arranged to receive the diaphragm unit 12. This unit is made up of an orifice plate 13 having the orifice 14 therethrough. The opposite sides of this plate are dished, as at 16, in order to provide a lower cavity 17 and an upper cavity 18 which may be filled with an actuating liquid 19 of any suitable substance. Diaphragms 20 and 21 are on the bottom and the top respectively of this orifice plate 13 and these diaphragms are held in place by the clamping ring 24, which overlies the periphery of the diaphragms and secures them firmly in place.

It will be observed that the unit 12 has been placed directly in contact with the pressure member 6 so that when pressure enters the passage 4 it will distort the resilient member 6 so that pressure will be applied to the diaphragm 20. The orifice 14 tends to damp the fluctuations of the diaphragm and, when the predominant pressure is applied from below, the liquid 19 will be forced into the upper cavity 18. This movement of the liquid will in turn distort the upper diaphragm 21 to flex it upwardly as seen in Fig. 2.

The upper diaphragm 21 may have a cushion member 30 thereon so as to protect the diaphragm.

The entire diaphragm unit 12 is held in place by the beam unit 31. This unit is best seen in Fig. 3 and comprises a body 32 which is of an annular configuration and has the bridge portion 33 formed thereon and upstanding above the upper edge 34 of the body 32. This bridge 33 is in the nature of a beam 35 whose ends are fixed and whose center is capable of flexure.

This beam has a pressure member or stem 37 connected centrally thereof and extending downwardly beneath the beam. This pressure member is shown as abutting the cushion member 30 directly above the diaphragm 21. The body 32 is positioned upon the diaphragm unit in the passage 4.

A cover plate 39 is positioned inside of the body 32 and is shown as abutting against the shoulder 40 in the body so that when the beam unit is clamped in position it will securely hold the diaphragm unit in place. The plate 39 serves the specific purpose of confining the diaphragm 21 so that the movement thereof will be uniform.

The assembly of the plate 39 and the pin 37 with the beam 35 is so arranged and designed that as pressure is applied by the diaphragm 21 through the pad 30 the deflection of the portion of the plate 39 nearest the pin 37 will be the same as that of the pin 37; it being understood that the deflection of the pin 37 is the deflection of the beam 35. It should be clear that there need exist no mechanical contact between the pin 37 and the plate 39. Naturally the maximum movement of the diaphragm will be at the center and this movement is transmitted to the stem 37 so that the stem moves in direct proportion to the movement of the diaphragm.

It will be noted from Figs. 1 and 2 that the beam unit is securely clamped in place by the shank 42 of the indicator housing 43. This shank 42 is threaded at 44 into the end of the nipple 2, and it will be noted that this shank is of the same internal diameter as the body 32 so that the corner or shoulder 45 thereof will engage the bridge 33 directly above its connection with the body 32. This will leave the beam 35 as spanning a distance equal to the internal diameter of the beam unit 32. In a construction of this sort the beam 35 operates in accordance with the principle and theory of fixed end beams.

The theory of the operation of the present pressure gauge is to take advantage of the well understood principles of the flexure of fixed end beams because it is well understood that a beam of this sort will flex in proportion to the load applied thereto. The load is therefore applied at a concentrated point through this stem 37, and at midpoints 47 and 48 on opposite sides of the center of the beam will, of course, be the points of greatest slope of the tangent to the elastic curve. In order to take advantage of this fact the upstanding lugs 49 and 50 have been formed on the upper surface of the beam at the points 47 and 48.

In Fig. 1 the beam is shown in its normal position whereas in Fig. 2 the beam has been subjected to flexure and it will be observed that due to this flexing of the beam the lugs 49 and 50 have been tiled outwardly because they will be normal to the tangent of the elastic curve of the beam at all times and the flexure of the beam will tilt these normally away from each other.

In order to take advantage of this movement of the lugs 49 and 50, the arms 51 and 52 respectively have been connected to these lugs.

The arm 51 serves as a support for the indicator mechanism indicated generally at 55. This arm 51 has a cross piece 56 on the upper end thereof, and the left end, as viewed in Fig. 1, carries a pivot shaft 57 upon which a rocker arm 58 is rotatably mounted. This rocker arm may have the balance weight 59 thereon so that the parts may be suitably balanced relative to each other. This arm 58 extends to the right as seen in Fig. 1 and carries a segment or sector portion 60, which has teeth thereon arranged to engage with the teeth on a pinion 61. This pinion 61 is mounted on a shaft 62 carried by the right side of the head 56. This part is broken away in order to show the pinion in Fig. 1.

An indicator disc 64 is fixed on the shaft 62 so that rotation of the pinion 61 serves to rotate the disc 64; as seen in Fig. 2 the front side of this disc has suitable calibrations 65 thereon which will pass a zero line 66 which is visible in the opening 67 of the housing 43.

In order to actuate the lever 58, the lever 58 is arranged to be moved about its pivot 57 by having the link 70 connected for movement in a slot 71. The opposite end of the link 70 is pivoted at 72 on the upper end of the arm 52. It will be observed that the pivot 73 by which the link is connected to the arm 58 is spaced from the pivot 57 about which the arm will move. With this construction it seems apparent that as the arms 51 and 52 move apart upon flexure of the beam 35 the lever 58 will be caused to move in a clockwise direction. This will rotate the pinion 61 and the indicator disc 64 in a counterclockwise direction as viewed in Fig. 1 so as to carry the calibrations past the zero line 66 in a positive direction. Particular attention is directed to the fact that this entire indicating mechanism is carried upon the arms 51 and 52 and therefore mounted upon the beam 35. The entire assembly will move to the left in accordance with the tilting of the arm 51 so that the disc 64 will have some relative movement in the openings 67. A maximum movement of the parts is thus obtained because the support moves to the left as viewed in Fig. 1, while the actuating arm 52 and link 70 will move in the opposite direction. Adjustment of the parts and calibration of the unit can be accomplished by adjusting the length of the arm 51 by means of the adjusting bolts 75 and, of course, the position of the links 70 may be adjusted on the arm 52 by the nut 76.

In operation it is only necessary to adjust the gauge by suitable application of pressure and it may be thereafter readily connected to any suitable source of pressure. The gauge is exceptionally accurate because there are no friction losses between the cover 39 and the stem 37 and the pressure will be uniformly applied due to the arrangement of the parts. It should be particularly noted that the housing 43 is fluid tight and a suitable oil lubricant or other clear liquid can be placed in the housing so that all of the parts are protected against corrosion and sudden changes in temperature. The presence of a liquid of this sort inside of the housing lubricates the parts for movement and serves to damp the action thereof so that greater accuracy is obtained.

What is claimed is:

1. A gauge of the character described comprising a housing, a pressure indicator therein, a mechanism to actuate said indicator, including a pair of arms, a beam to be flexed by the applied pressure, means connecting both of said arms to said beam so that said arms move apart to actuate said indicator in proportion to the flexing of said beam, and a load pin to transmit the pressure to flex said beam.

2. A gauge of the character described comprising a housing, a pressure indicator, a mechanism to actuate said indicator including a pair of arms, a beam to be flexed by the applied pressure, and means connecting said arms to said beam so that said arms move apart to actuate said indicator in proportion to the flexing of said beam, said indicator including a rotatable disc.

3. A gauge of the character described comprising a housing, a pressure indicator, a mechanism to actuate said indicator including a pair of arms, a beam to be flexed by the applied pressure, and means connecting said arms to said beam so that said arms move apart to actuate said indicator in proportion to the flexing of said beam, said mechanism also including a sector and pinion operable by movement of said arms.

4. In a pressure gauge a device to flex in proportion to the applied pressure including a beam member, means to fix the ends of said beam and concentrate the pressure load at the center thereof so that points of greatest flexure upon bending of the beam will be on opposite sides of the center, means connected to said beam at the points of greatest flexure to indicate the flexure as a measure of the applied pressure, and additional means to apply a load to said beam.

5. In a pressure gauge a device to flex in proportion to the applied pressure including a beam member with fixed ends and a concentrated center load so that points of greatest flexure upon bending of the beam will be on opposite sides of the center means connected to said beam at the points of greatest flexure to indicate the flexure as a measure of the applied pressure, additional means to apply pressure to said beam including a diaphragm, and a cover plate to confine said diaphragm and to flex with said beam.

6. A pressure gauge including a body to be connected to a pressure pipe, a passage therein, a cushion piece of resilient material in said passage and against which the pressure is applied, a diaphragm unit disposed against said piece, a beam member abutting said unit and to be flexed by the transmitted pressure of the diaphragm unit, an indicator device connected to said beam to operate upon flexing of said beam, and an indicator housing connected to said body to confine said piece, unit and beam.

7. A pressure gauge including a beam, means to fix both ends of said beam, spaced means to be relatively tilted by flexing of said beam to amplify the movement thereof, means to flex the beam as a function of the applied pressure, and a housing for both of said means said spaced means forming a part of said beam.

8. A pressure gauge including a beam, means to fix both ends of said beam, spaced means to be relatively tilted by flexing of said beam to amplify the movement thereof, means to flex the beam as a function of the applied pressure, and a housing for both of said means, said housing being fluid tight to contain a viscous fluid to protect and to damp the movement of said means, said spaced means comprising integral upstanding portions on said beam.

9. A gauge of the character described comprising a beam member having its opposite ends rigidly fixed to be flexed symmetrically by the application of pressure, a pair of spaced arms thereon to be tilted by such flexing, and an indicator device carried by said arms including means to actuate said indicator.

10. A gauge of the character described comprising a beam member having its opposite ends rigidly fixed to be flexed symmetrically by the application of pressure, a pair of spaced arms thereon to tilt away from each other by such flexing, and an indicator device carried by said arms, said device including a sector lever to be tilted by said arms and a pinion to rotate in proportion to the tilting.

11. In a pressure gauge construction, a load diaphragm, a load pin movable with and by said diaphragm, a beam, means to fix the ends of said beam so that it may be flexed by said pin, and spaced means fixed to the beam to be moved by the flexing action of said beam to indicate the pressure causing such flexing by the relative movement of the said spaced means.

12. In a pressure gauge, a flexible fixed end beam, a load member movable by the applied pressure to flex said beam at its center, an indicator mechanism, and means on the quarter points of said beam and connected to said mechanism to actuate said mechanism as a function of the flexing of said beam which is caused by the applied pressure.

13. In a pressure gauge a device to flex in proportion to the applied pressure including a beam member, means to fix the ends of said beam so that points of greatest flexure upon bending of the beam will be on opposite sides of the center, means to apply the pressure load at the center of the beam, and means connected to said beam at the points of greatest flexure and operable to indicate the flexure as a measure of the applied pressure.

HERBERT ALLEN.